US012320786B2

(12) United States Patent
Zhu et al.

(10) Patent No.: US 12,320,786 B2
(45) Date of Patent: Jun. 3, 2025

(54) GAS SAMPLE SELECTOR

(71) Applicant: Agilent Technologies, Inc., Santa Clara, CA (US)

(72) Inventors: Kaike Zhu, Shanghai (CN); Chenxi Chen, Shanghai (CN); Wei-Jun Yao, Shanghai (CN)

(73) Assignee: Agilent Technologies, Inc., Santa Clara, CA (US)

( * ) Notice: Subject to any disclaimer, the term of this patent is extended or adjusted under 35 U.S.C. 154(b) by 487 days.

(21) Appl. No.: 17/771,366

(22) PCT Filed: Oct. 29, 2019

(86) PCT No.: PCT/CN2019/114016
§ 371 (c)(1),
(2) Date: Apr. 22, 2022

(87) PCT Pub. No.: WO2021/081754
PCT Pub. Date: May 6, 2021

(65) Prior Publication Data
US 2022/0357303 A1     Nov. 10, 2022

(51) Int. Cl.
*G01N 30/40* (2006.01)
*G01N 30/20* (2006.01)

(52) U.S. Cl.
CPC .............. *G01N 30/40* (2013.01); *G01N 30/20* (2013.01); *G01N 2030/402* (2013.01)

(58) Field of Classification Search
None
See application file for complete search history.

(56) References Cited

U.S. PATENT DOCUMENTS

| | | |
|---|---|---|
| 4,359,891 A | 11/1982 | Ahlstrom et al. |
| 6,038,934 A | 3/2000 | Peterson |
| 2001/0029979 A1 | 10/2001 | Zheng et al. |
| 2003/0053937 A1 | 3/2003 | Akporiaye et al. |
| 2003/0158674 A1 | 8/2003 | Powell et al. |

(Continued)

FOREIGN PATENT DOCUMENTS

| | | |
|---|---|---|
| CN | 103698445 A | 4/2014 |
| CN | 104569456 A | 4/2015 |
| CN | 206627483 U | 11/2017 |

(Continued)

OTHER PUBLICATIONS

PCT, "Notification of Transmittal of The International Search Report & Written Opinion mailed on Jul. 29, 2020," Application No. PCT/CN2019/114016, 10 pages.

*Primary Examiner* — Daniel S Larkin

(57) ABSTRACT

A gas analyzer system (100, 200, 300) and methods of reducing sample carryover in a gas sample selector (102, 202, 302), The gas analyzer system (100, 200, 300) includes a gas chromatograph (104, 204, 304) and a gas sample selector (102, 202, 302). The gas sample selector (102, 202, 302) includes a multi-position selector valve (130, 230, 330), a flush valve (140, 240, 340), and a purge valve (150, 250, 350), as well as conduits providing flowpaths between them. When switching the flush valve (140, 240, 340) to connect the flush valve (140, 240, 340) vent and flush valve (140, 240, 340) outlet and flowing purge gas through the purge valve (150, 250, 350) port, the purge gas will flow to the selector (102, 202, 302) exit and to the flush valve (140, 240, 340) vent to remove sample gas from the flowpaths.

20 Claims, 7 Drawing Sheets

(56) References Cited

U.S. PATENT DOCUMENTS

2010/0107730 A1   5/2010   Aono
2012/0103074 A1   5/2012   Likuski et al.

FOREIGN PATENT DOCUMENTS

| CN | 108226322  | A  | 6/2018  |
| CN | 108548879  | A  | 9/2018  |
| CN | 208013154  | U  | 10/2018 |
| CN | 109541054  | A  | 3/2019  |
| CN | 209014525  | U  | 6/2019  |
| JP | S6024433   | A  | 2/1985  |
| JP | H01265157  | A  | 10/1989 |
| JP | H085619    | A  | 1/1996  |
| JP | H09101293  | A  | 4/1997  |
| JP | H09138225  | A  | 5/1997  |
| JP | H10227777  | A  | 8/1998  |
| JP | 2012154680 | A  | 8/2012  |
| WO | 2021081754 | A1 | 5/2021  |

GAS SAMPLE SELECTOR

CROSS-REFERENCE TO RELATED APPLICATIONS

This application is a US national stage entry of PCT/CN2019/114016 filed on 29 Oct. 2019, the contents of which are to be taken as incorporated herein by this reference.

FIELD OF THE INVENTION

The present disclosure relates generally to gas sample selectors for a gas analyzer and to methods of operating a gas sample selector to reduce sample carryover.

BACKGROUND OF THE INVENTION

Gas chromatographs (GC) can analyze gas samples by separating the constituents of the sample and producing a signal that indicates the relative amount and/or identity of an analyte in the sample. A known and/or repeatable volume of sample is injected or inserted into the flowpath and the sample is carried through a GC column, which is typically heated, containing a stationary phase that separates the analytes, and exits through a detector which produces a signal indicative of the relative amount and/or identity of analyte in the sample. A carrier gas moves the sample through the GC flowpath. Typical carrier gases used in gas chromatography include helium, hydrogen, nitrogen, and a mixture of argon and methane.

Samples to be analyzed by a gas chromatograph can be provided in various types of containers. For example, samples are sometimes contained in a gas phase in a pressurized gas cylinder (typically 10 to 400 psig) or in a sample bag (typically 0 to 10 psig). Gas sample selectors have been used with gas chromatographs to facilitate switching between multiple samples to be introduced into the flowpath of a GC analyzer. Existing gas sample selectors typically have selector entrances which can be connected to sample containers. The selector entrances are connected to a multi-position selector valve within the gas sample selector that has a plurality of valve inlets for the plurality of samples. To inject a sample of repeatable and/or known volume into the flowpath, the multi-position selector valve is fluidically connected to a sample loop attached to a 6-port, 2-way switching valve in a GC. The sample loop is typically a piece of tubing of known volume with a precise length and/or diameter. Typical volumes for the sample loop range from 0.025 to 10 ml. During filling of the sample loop for samples contained in high pressure gas cylinders, the sample loop is attached to the outlet of the multi-position selector valve on one end to receive the sample and vented to the atmosphere on the outlet of the sample loop. A restrictor is typically located between the multi-stream selection valve and sample loop to reduce the flow rate of the gas sample coming from the high-pressure cylinder to allow for repeatable filling of the sample loop. For existing gas sample selectors for samples contained in lower-pressure gas bags, there is not typically a restrictor in the gas sample selector flowpath (or there is a smaller restrictor than used for the high-pressure cylinders) between the multi-position selector valve and the sample loop due to it being unnecessary to reduce the flowrate of the sample from the gas bags, which are at a lower pressure than the cylinders. Additionally, for a gas bag sample selector, the outlet of the sample loop is attached to a pump, which acts to draw the sample into the sample loop. This is necessitated due to the low pressure of the sample bag not being sufficient to reliably and repeatably fill the sample loop without assistance. After the sample loop is filled, the 6-port, 2-way valve is switched to place the sample loop in line with the GC column flowpath, and carrier gas pushes the sample contained in the sample loop onto the GC column for analysis.

Due to the different requirements for filling the sample loop (i.e. a restrictor to reduce flow from the high-pressure gas cylinder vs. a pump to draw sample from the low-pressure gas bag), gas bags and gas cylinders cannot be analyzed on the same GC system, requiring a user who wants to use gas sample bags and gas sample cylinders to use and maintain two separate systems.

One item that may cause problems in a gas chromatography analysis is carryover, a portion of one sample remaining in the flowpath after that sample has been analyzed. These analytes can then exit through the detector during subsequent analyses and show up as peaks, noise, and/or elevated baselines on the chromatogram for other samples.

Techniques to reduce sample carryover contamination in a gas sample selector from sample loading, selector switching or sample injection have involved using the next sample to flush the old sample out of portions of the flowpath and might impact analytical accuracy. One solution to reduce sample loading carryover contamination has been to employ a flush valve in the gas sample selector. To reduce carryover from one sample to the next in existing gas sample selectors, a flush valve position is included in the flowpath between the multi-position selector valve and the 6-port, 2-way gas sampling valve. When switching between samples using the multi-position selector valve, the flush valve, which is an on/off valve, is opened, and some of the next sample is flushed out through the flush valve and sample loop flowpath to push any remaining previous sample out of the flowpath between the selector valve and the exit of the sample loop. A long flushing time is required for a new sample to purge the flowpath of the previous sample, and sometimes the previous sample can diffuse back into the new sample depending on any pressure differences between the samples. The time to purge and the amount of remaining sample that may cause carryover is dependent on the volume of the flowpath and the pressure of the gases. Additionally, using a sample to flush out a previous sample will waste sample, requiring a larger amount of sample to be collected for analysis.

Additionally, the flush valve is employed when replacing the sample containers connected to the gas sample selector. In order to vent the enclosed contaminating gas after attaching a gas source to a selector entrance (such as by attaching male-female quick connectors), the flush valve is opened, and after flushing sample for a few seconds, the flush valve is closed again. The process is manual and inconvenient, and the user may forget to close the flush valve which results in loss of sample for further analysis.

SUMMARY OF THE INVENTION

As an aspect of the invention, new gas sample selectors are provided. As another aspect, novel methods of reducing carryover in a gas sample selector for a gas analyzer system are provided.

These and other features and advantages of the present devices and methods will be apparent from the following detailed description, in conjunction with the appended claims.

Figure 1A:
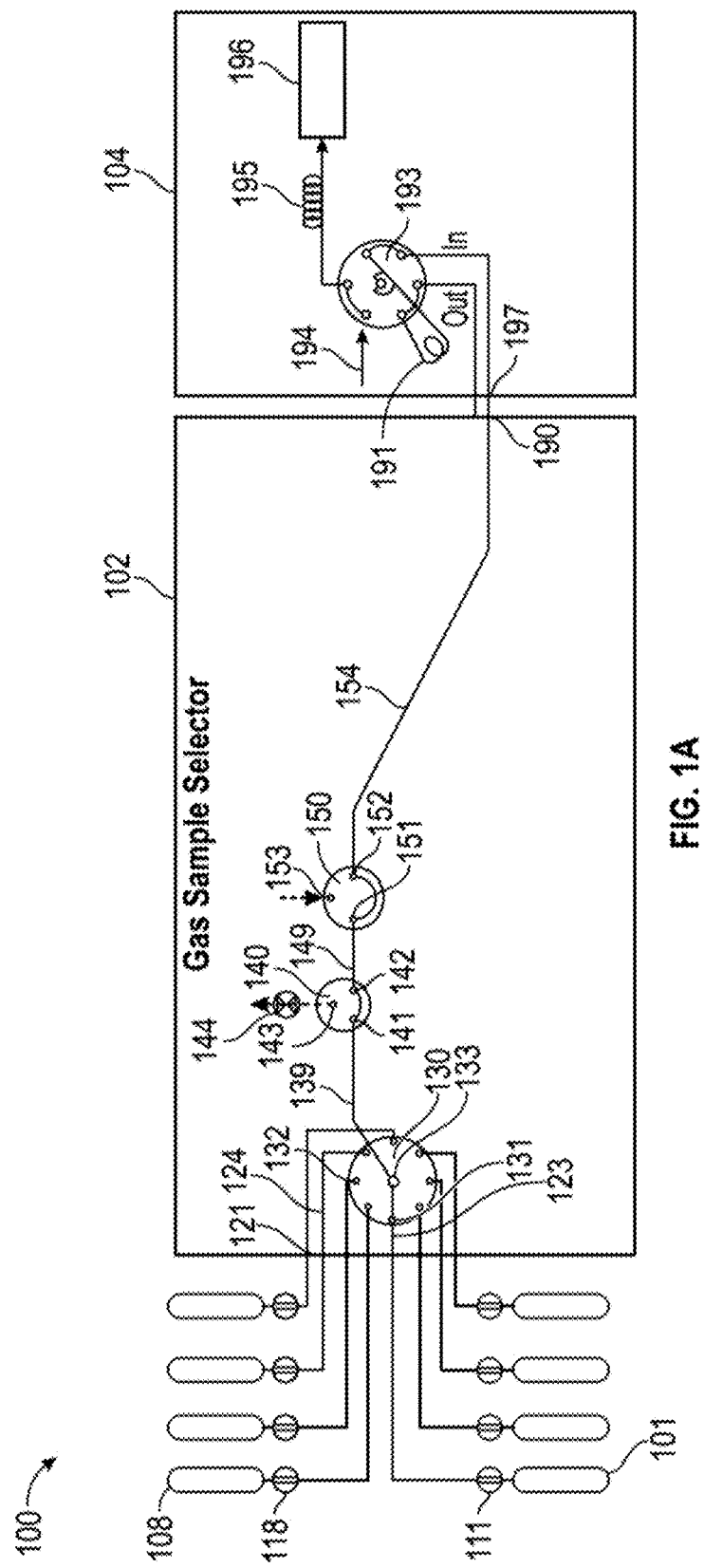
FIGS. 1A, 1B and 1C show an embodiment of the present gas sample selector for a plurality of high-pressure gas samples.

In the accompanying drawings, solid lines and dotted lines are generally used to illustrate various flowpaths available within an apparatus. For some operations described herein, solid lines are used to indicate that gas flows through that flowpath or the flowpath is open, while dotted lines indicate gas is not flowing or that the flowpath is closed. It should be recognized that dotted lines do not necessarily represent a different structure compared to solid lines.

The features in the drawings are not necessarily drawn to scale. The present teachings are best understood from the following detailed description when read with the accompanying drawings.

DETAILED DESCRIPTION

In view of this disclosure, it is noted that the devices and methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

Figure 1B:
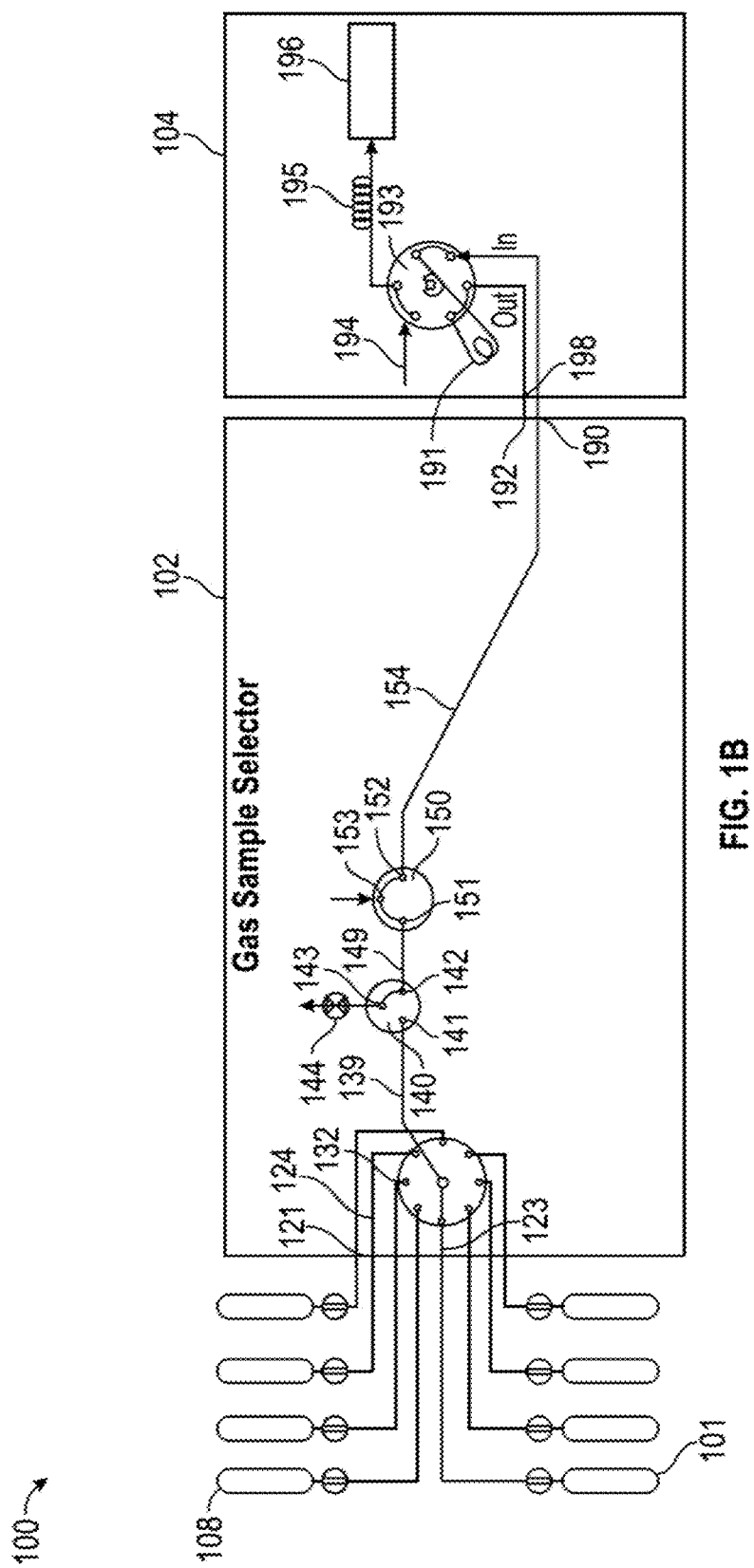
Figure 1C:
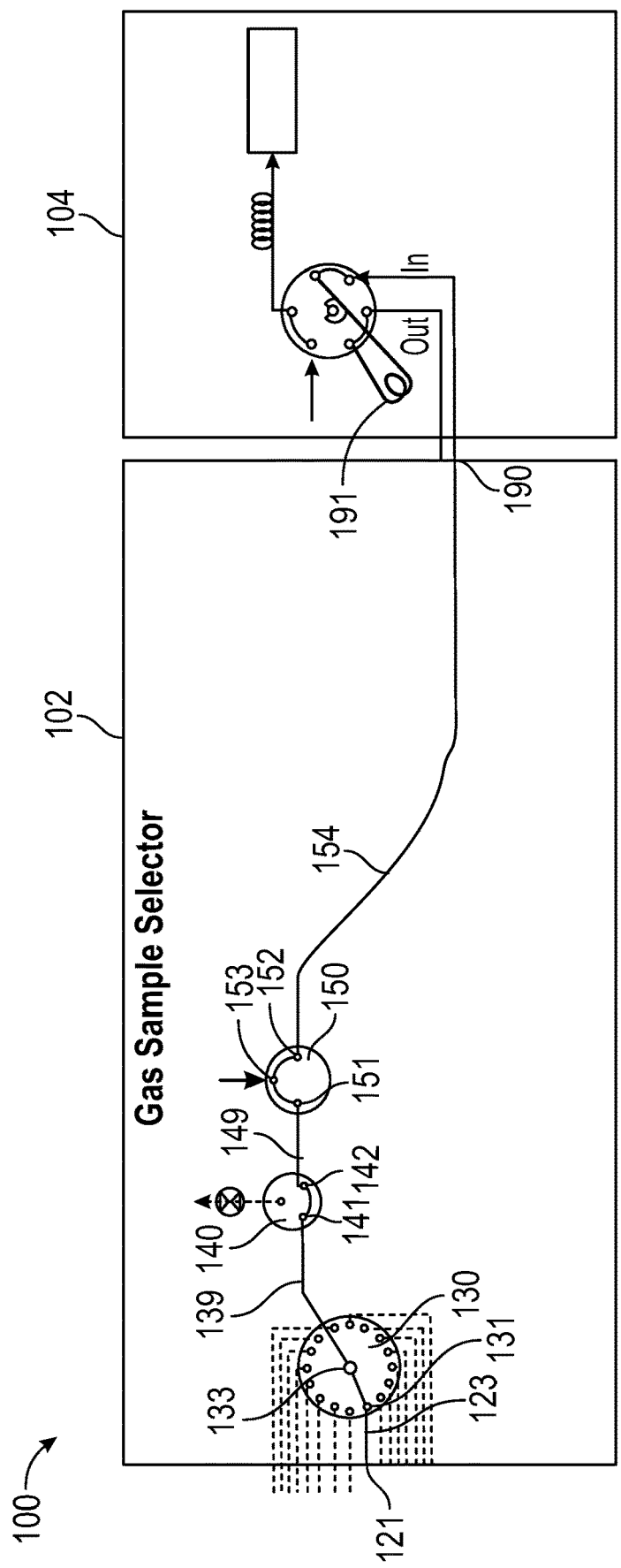

FIGS. 1A, 1B and 1C show an embodiment of the present gas sample selector (GSS) 102 as part of a gas analyzer system 100. The gas sample selector 102 comprises a multi-position selector valve 130, a flush valve 140, and a purge valve 150, as well as conduits providing flowpaths between them. FIGS. 1A, 1B and 1C illustrate how the gas sample selector can be used for loading a gas sample into a gas chromatograph 104, followed by purging of the conduits of the gas sample selector, thereby reducing carryover contamination. The multi-position selector valve 130 is fluidically connected to the flush valve 140, which is fluidically connected to the purge valve 150. As discussed in more detail below, the term "fluidically connected" means as used herein that two components are in fluid communication and includes direct and indirect connections.

More particularly, the gas sample selector 102 is connected to one or more gas sample containers (for example, containers 101, 108). The containers can contain high-pressure gas samples. As used herein, the term "high-pressure" as used in this disclosure means a pressure sufficient for a gas to flow through a flowpath of the gas sample selector without assistance, such as from a pump or from pressure added by another source. In some embodiments, a high pressure is a pressure sufficient to generate a flowrate of 10-300 ml/min through a flowpath of the gas sample selector. By way of example, high-pressure gas samples generally have a pressure in the range from 10 to 400 psig. The containers may include a shutoff valve (for example, shutoff valve 111) attached to the outlet of the container which is opened after attaching the sample container to the gas sample selector to allow the gas sample to exit the container. In FIG. 1A, shutoff valve 111 is open, allowing a gas sample from container 101 to be loaded into the sample loop 191 of gas chromatograph 104. Shutoff valves for other containers (for example, shutoff valve 118 for container 108) are also open, allowing the flow of gas samples from those other containers to the gas sample selector 102, more particularly to the inlets of the multi-position selector valve 130. The gas sample selector 102 comprises a plurality of selector entrances for receiving gas samples (for example, selector entrance 121). The gas sample selector 102 also comprises a multi-position selector valve 130 that selects which gas sample flows through the GSS to the gas chromatograph 104. The selector entrances may comprise a connector to attach the gas sample containers to the gas sample selector, such as a quick connector, or other fitting suitable for connecting conduits for fluid flow. In some embodiments, mating connectors are used, wherein a gas sample container comprises a male connector and the selector entrance comprises a female connector (or vice versa). When the connectors are physically connected, the female connector is open, and when the connectors are disconnected, the female connector is closed. In some embodiments, the sample containers can be connected directly to a selector valve, and in that case, the selector entrances are the selector valve inlets on the selector valve 130. In some embodiments, the selector valve is a rotary valve comprising a plurality of selector valve inlets and at least one selector valve outlet in the stator, and a switchable fluid path, which may be a groove or channel in the rotor. By rotating the stator and/or the rotor, the switchable fluid path connects a different one of the selector valve inlets with the at least one selector valve outlet. The selector valve 130 comprises a plurality of selector valve inlets (for example, selector valve inlets 131, 132) and at least one selector valve outlet 133. In FIG. 1A, the gas sample from container 101 enters the gas sample selector through selector entrance 121 and passes through loading conduit 123 to selector valve inlet 131. The loading conduits are optional, as in some embodiments, selector entrances are directly connected to selector valve inlets. The selector valve 130 is in a position so that the gas sample passes to selector valve outlet 133, and the gas sample from container 108 (and any other container) are blocked. When the selector valve 130 is moved to a different position, a different selector valve inlet 132 is fluidically connected to the selector valve outlet 133. In some embodiments, the multi-position selector valve has one or more positions where no selector valve inlet is fluidically connected to the selector valve outlet, such as to provide a closed valve position, for example. In some embodiments, the selector 102 also comprises a plurality of loading conduits (for example, loading conduits 123, 124). The loading conduits connect the selector entrances to the selector valve inlets. Exemplary loading conduits include tubing made of stainless steel or other inert material.

The selected gas sample flows from selector valve outlet 133 to a selector-flush conduit 139, which is fluidically connected at its other end to a flush valve 140. The flush valve 140 has at least two flush valve positions. In one of the positions (which is the position shown in FIG. 1A), the flush valve 140 provides a flowpath between the flush valve inlet 141 and the flush valve outlet 142, allowing the gas sample to pass through flush-purge conduit 149 to purge valve 150.

The flush valve 140 can be a 2-way valve capable of providing a flowpath between the flush valve inlet 141 and the flush valve outlet 142 and, in the second valve position, a flowpath between the flush valve outlet 142 and the flush valve vent port 143. In other embodiments, a 3-way valve capable of providing different flowpaths among a flush valve inlet 141, a flush valve vent port 143, and a flush valve outlet 142. In some embodiments, the flush valve may be a 3-, 4-, 6- or 10-port rotary valve, which provides minimal dead volume for a sample to become trapped in and allows for high pressure operation or in other embodiments, the flush valve may be a solenoid valve. The flush valve vent port 143 can vent to a surrounding area around the gas sample selector 102 (e.g., a room, a laboratory hood, etc.) or to a gas container for collecting waste gas. In some embodiments, the flush valve vent port 143 can be fluidically connected to a flow restrictor 144. The flow restrictor could be an adjustable needle valve or a tubing of specified inner diameter and length used to limit the flow through the flush valve vent port.

In other embodiments (not shown), the flush valve is a 2-port valve with on/off positions, and in the "on" position the flush valve inlet and the flush valve outlet are fluidically connected, and in the off position, they are not fluidically connected.

Purge valve 150 has at least two purge valve positions. In one of the purge valve positions (which is the position shown in FIG. 1A), the purge valve 150 provides a flowpath between a purge valve inlet 151 and a purge valve outlet 152 without connecting them to a purge gas source. The gas sample flows out of purge valve outlet 152 and into purge-exit conduit 154. Examples of suitable valves for the purge valve 150 include flow switching valves. Other examples include a combination of a tee connecting the three purge valve ports and shutoff valve attached to the purge valve outlet, although this introduces more dead-volume in the flowpath in which sample may become trapped. Alternatives are a 3-port, 2- or 3-way switching valve, which flows purge gas to different portions of the GSS in different purge valve positions. For example, in one purge valve position, such as for loading a gas sample to a sample loop, the purge valve inlet and outlet are fluidically connected, then it could switch to another position where the purge gas was fluidically connected to the purge valve outlet and purge the flowpath after the purge valve (e.g., a downstream portion of the GSS), then it switches again and the purge gas and inlet are fluidically connected and it purges the flowpath between the purge valve and the flush valve (e.g., an upstream portion of the GSS). It is also contemplated that, for high pressure samples, purge-exit conduit 154 may contain a flow restrictor (not shown) sized to limit the flow of sample gas from a sample container through the flowpath to promote repeatable and reliable filling of the sample loop. In some embodiments, this flow restrictor is an adjustable needle valve that can be set to limit flow based on the pressure of attached sample containers. In other embodiments, it may be a fixed restrictor, such as a tube of known inner diameter and length. Typical sample flows during filling of a sample loop can range from 10 mL/min to 300 mL/min.

The selector 102 also comprises a selector exit 190 through which the gas sample flows out of the selector 102 to the gas chromatograph 104, more particularly to a gas chromatograph entrance 197. In FIG. 1A, purge-exit conduit 154 connects selector exit 190 to the purge valve outlet 152, though it is contemplated that the selector exit 190 can be indirectly fluidically connected to the purge valve 150 via one or more other components or if no flow restrictor is included in purge-exit conduit, the purge valve outlet 152 could also serve as the selector exit 190. The purge valve 150 is fluidically connected to a purge gas source, though in FIG. 1A, the purge valve is closed so that the purge gas is blocked from the gas selector during loading of sample into the sample loop of the gas chromatograph.

FIG. 1A shows the valves in a state to fill the sample loop with sample from the selected gas sample container. In many gas chromatographs, sample loops are filled with a gas sample, then fluidic connections are switched to load the gas sample from the sample loop into a GC column. The chosen sample flows from the connected sample container, through the multi-position selector valve 130, through the flush valve 140 and purge valve 150 and into the gas sampling valve 193 in the gas chromatograph 104, where it flows through one or more sample loops or flowpaths, such as the sample loop 191 in order to fill the sample loop with sample gas. When filling the sample loop, the outlet of the sample loop can be vented to atmosphere in this configuration where the samples are high-pressure gas cylinders. The time to fill the sample loop is based on the flow rate of the gas and the volume of the sample loop. The sample loop may be attached to a 2-port, 6 way sampling valve or other valve capable of placing the sample loop in line with either the selector flowpath as shown in FIG. 1A or the GC column flowpath; however, other configurations are also considered including one or more sampling valves with more or less than 6 ports and more or less than 2 positions and one or more sample loops. In some embodiments, after the sample loop is filled with the gas sample, and before it is placed in fluidic connection with the GC column 195, the flush valve 140 is switched to fluidically connect flush valve outlet with flush valve vent port so that the pressure in the sample loop 191 can equilibrate with the surrounding area. This pressure equilibration step can be performed for about 3 to about 10 seconds. After the sample loop 191 is sufficiently filled with sample, the 6-port, 2-way gas sampling valve 193 is switched to a second position (not shown) and carrier gas from port 194 pushes the contents of the sample loop onto the GC column 195 and through a detector 196 for detecting analytes in the sample gas. Typical sample flows range from 10 ml/min to 300 ml/min when filling the sample loop and 2 ml/min to 40 ml/min when moving through the GC column.

FIG. 1B illustrates operation of the gas sample selector 102 when one desires to purge the gas sample from some of the conduits of the gas sample selector 102 and, optionally, the gas chromatograph 104, notably the sample loop 191. More particularly, after the gas sample from container 101 has been run, the positions of the purge valve 150 and the flush valve 140 are switched so that residual sample gas (that is, gas sample that was not loaded into the GC flowpath containing the column) is removed from the flowpath, including the sample loop 191, and carryover is prevented. Purge valve 150 is opened to receive purge gas from purge valve port 153, and flush valve 140 is switched to a position that provides a flowpath between the flush valve outlet 142 and the flush valve vent port 143. In other embodiments, a 2-way flush valve is switched to an off position. The flush valve can be switched simultaneously, or before the purge valve is opened. The purge valve 150 and/or the flush valve 140 can be switched manually or (preferably) automatically. In this purge valve position, the purge valve 150 allows the flow of purge gas from purge valve port 153, so that purge gas flows to the purge valve inlet 151 and the purge valve outlet 152. In other embodiments, where the flush valve is a 2-way valve in the off position, the purge valve 150 can be switched to a position that allows flow of purge gas from purge valve port 153 to purge valve outlet 152. Purge valve port 153 is fluidically connected to a source of purge gas, such as a chemically inert gas (for example, nitrogen, argon, or helium) or air. In some embodiments, the purge gas is the same type of gas being used as the carrier gas for the GC. In this operation, the purge gas flows into the purge-exit conduit 154, removing residual sample gas downstream of the purge valve and preventing carryover. A restrictor, adjustable or fixed, may be fluidically connected to purge valve port 153 to limit the total flow of purge gas into the gas sample selector. Typical purge flow may be 100 mL/min to 1000 mL/min. The gas sampling valve 193 in the GC 104 is positioned such that the sample loop 191 is in the flowpath of the gas exiting the gas sample selector through selector exit 190, allowing the sample loop 191 to also be purged. The purge gas then flows out chromatograph exit 198 to the environment or, in some embodiments, it can return to the gas sample selector 102 through a selector return port 192. In the embodiment shown in FIG. 1B, purge gas also flows through the flush-purge conduit 149, and out flush valve vent port 143 removing remaining sample gas downstream of the flush valve, thereby preventing carryover contamination from that residual sample gas. A flow restrictor 144 is provided to control the flow rate of purge gas vented to the atmosphere. Exemplary flow rates for the purge gas include from about 100 to about 1000 mL/min, and exemplary purge times include from about 0.1 min to about 5 min; in some embodiments, the purge time is substantially the same as the time for performing analysis of the gas sample in the gas chromatograph 104. Purging times are dependent on the volume of the flowpath, the type of sample, and the flow rate of the purging gas. The flow restrictor 144 allows splitting of the purge flow substantially evenly between the flowpath downstream of the purge valve, which has an inherent restriction based on the conduits, sample loop, and/or sampling valve, and the flowpath upstream of the purge valve. The amount of restriction may be specified based on the existing restriction between the purge valve and exit of the sample loop in order to balance the flow of purge gas through the inlet and outlet of the purge valve and sufficiently sweep the flowpath upstream and downstream of the purge valve. This flow restrictor can be a needle valve, a piece of tubing with a specified inner diameter and length, or other devices capable of reducing the flow rate of a fluid.

FIG. 1C illustrates operation of the gas sample selector 102 when one desires to purge the gas sample from additional conduits of the gas sample selector 102, namely, upstream of the flush valve 140. In FIG. 1C, the gas sample containers have been disconnected from the gas sample selector 102, and flush valve 140 is switched to a position where flush valve inlet 141 and flush valve outlet 142 are fluidically connected, providing a flowpath from purge valve 150 through the selector valve 130 (via outlet 133 and inlet 131), loading conduit 123, and selector entrance 121. Optionally a user can deliberately open the selector entrance if it is not automatically open after a gas sample container is disconnected, such as by inserting a reciprocal connector in the selector entrance. The purge gas introduced by purge valve port 153 removes sample gas from one or more of the loading conduit 123, the selector-flush conduit 139, the multi-position selector valve 130, and the selector entrance 121. In some embodiments, some or all of the gas sample containers are disconnected from the gas sample selector 102, and selector valve 130 is switched between positions so that residual sample is removed from some or all of the other loading conduits. Purge gas also flows through purge-exit conduit 154, out the selector exit 190 and into the gas chromatograph, where it flows through sample loop 191. In this procedure, which can be referred to as sweeping, residual sample is removed from the gas sample selector 102 and the flowpath containing the sample loop 191 in the gas chromatograph 104 thereby preventing or reducing carryover.

In the system shown in FIGS. 1A, 1B, and 1C, gas cylinders (or containers with sufficient internal pressure to fill the sample loop without additional assistance) are attached to selector entrances. The present disclosure also provides an automated method of switching between the different gas sample containers so that their different gas samples can be efficiently and reliably provided to the gas chromatograph 104. When the gas sample selector 102 receives a signal indicating that a new sample is to be loaded and analyzed, such as a new sample position signal from an external device (like the gas chromatograph, computer with RS-232, or other type of gas analyzers etc.), the multi-position selector valve 130 is switched to a different position which corresponds to a different sample container. At the same (or approximately the same time), flush valve 140 is opened to fluidically connect flush valve inlet 141 and flush valve outlet 142 so the previous sample sealed inside dead volume between port of multi-position selector valve 130 and flush valve 140 is vented and then flushed by the new sample. After a short time, flush valve 140 is closed again (i.e. flush valve inlet 141 not fluidically connected to flush valve outlet 142) so that new sample is held in gas sample selector 102. This mechanism minimizes carryover contamination caused by selector switching.

Figure 2:
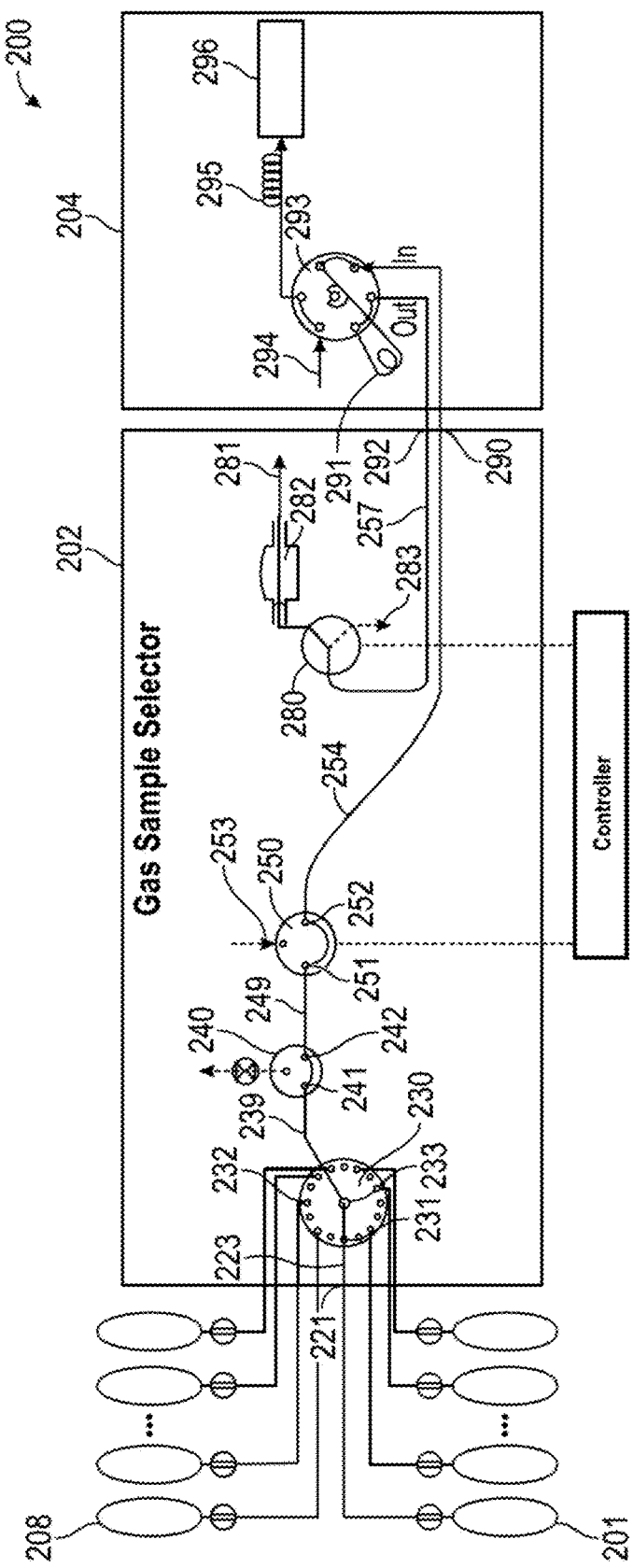
FIG. 2 shows an embodiment of the present gas sample selector for a plurality of low-pressure gas samples.

FIG. 2 shows an embodiment of the present gas sample selector configured for a plurality of low-pressure gas samples (for example, gas bags 201, 208). As used in this disclosure, the term "low-pressure" means a pressure that is insufficient for a gas to flow through a flowpath of the gas sample selector at a desired flow rate without assistance. In some embodiments, the desired flowrate may be between 10 and 300 mL/min. Such a gas would require assistance, such as from a pump or from pressure added by another source, to flow through the flowpath at the desired flowrate. By way of example, a gas sample having a pressure from about 0 to 10 psig would require assistance. The state of the valves shown in FIG. 2 configures the flowpath to fill the sample loop with sample to later be inserted into the GC flowpath for analysis. The gas sample selector 202 comprises a multi-position selector valve 230, a flush valve 240, and a purge valve 250, as well as conduits 239, 249 providing flowpaths between them. The gas sample selector 202 is part of a gas analyzer system 200, and it is fluidically connected to a gas chromatograph 204 and to a plurality of gas bags (for example, 201, 208) or other containers which contain low-pressure gas samples. The containers may include a shutoff valve attached to the outlet of the container which is opened after attaching the sample to the gas sample selector to allow the gas sample to exit the container. The gas sample from container 201 is being loaded through selector entrance 221 and loading conduit 223 to selector valve inlet 231. The multi-position selector valve 230 is in a position where selector valve inlet 231 is fluidically connected to selector valve outlet 233 and gas samples from container 208 (and any other container) are blocked. Selector valve 230 can be moved to a different position (e.g., selector valve inlet 232) in order to select a different gas sample for analysis.

The selected gas sample flows from selector valve outlet 233 to a selector-flush conduit 239, which is fluidically connected at its other end to a flush valve 240. In the flush valve position shown in FIG. 2, the flush valve 240 provides a fluid path between the flush valve inlet 241 and the flush valve outlet 242, allowing the gas sample to pass through flush-purge conduit 249 to purge valve 250. Purge valve 250 provides a flowpath between a purge valve inlet 251 and a purge valve outlet 252, but it is closed to flow of purge gas into the system from purge valve port 253. The gas sample flows out of purge valve outlet 252 and into purge-exit conduit 254, which is fluidically connected at its other end to selector exit 290 (though it is contemplated that the selector exit 290 can be indirectly fluidically connected to the purge valve 250 via one or more other components).

The embodiment of the present gas sample selector shown in FIG. 2 is configured for a plurality of low-pressure gas samples. In this embodiment, the gas sample selector 202 comprises a gas sample pump 282 and, optionally, a pump valve 280 attached to the outlet of the GC gas sampling valve 293, which is positioned downstream of the sample loop 291 during filling of the sample loop 291. Examples of suitable gas sample pumps include diaphragm pumps and vacuum pumps. The pump 282 is provided because a low-pressure gas sample will not adequately fill a sample loop by venting to the atmosphere without a motive force. Accordingly pump valve 280 has a position in which the gas sample can be drawn by pump 282 through the flowpath including the sample loop to vent 281.

Pump 282 is fluidically connected to the conduits of the gas sample selector 202 so that it can draw gas out of the selector and optionally out of the gas chromatograph. In FIG. 2, the pump is fluidically connected to a flowpath that comprises the selector exit 290, the sample loop 291 of the gas chromatograph 204, a selector return port 292, and a return-valve conduit 257. The gas chromatograph 204 includes a gas sampling valve 293, which can be switched among positions, such as a position where sample gas flows from the sample loop to GC column 295, and a position where the sample gas flows through and/or fills the sample loop and excess is vented. The gas chromatograph 204 can also include a carrier gas port 294 for receiving a carrier gas to push the sample gas through the GC column, and a detector 296 for detecting analytes in the sample gas. The selector return port 292 is fluidically connected to the sample loop 291 and allows return of the gas sample from the gas chromatograph 204 to the gas sample selector 202 when filling the sample loop or purging the flowpath. The return-valve conduit 257 connects the selector return port 292 to the pump valve 280.

The flush valve 240 and purge valve 250 in FIG. 2 can be operated in generally the same manner as described above in FIGS. 1B and 1C for the flush valve 140 and purge valve 150 for purging sample gas from the gas sample selector 202 and from the sample loop 291. However, in embodiments where a low-pressure sample gas is used, during purging, valve 280 is switched to the vent 283, as the purge gas is generally at a higher pressure than the sample gas and pump 282 is not needed.

Figure 3A:
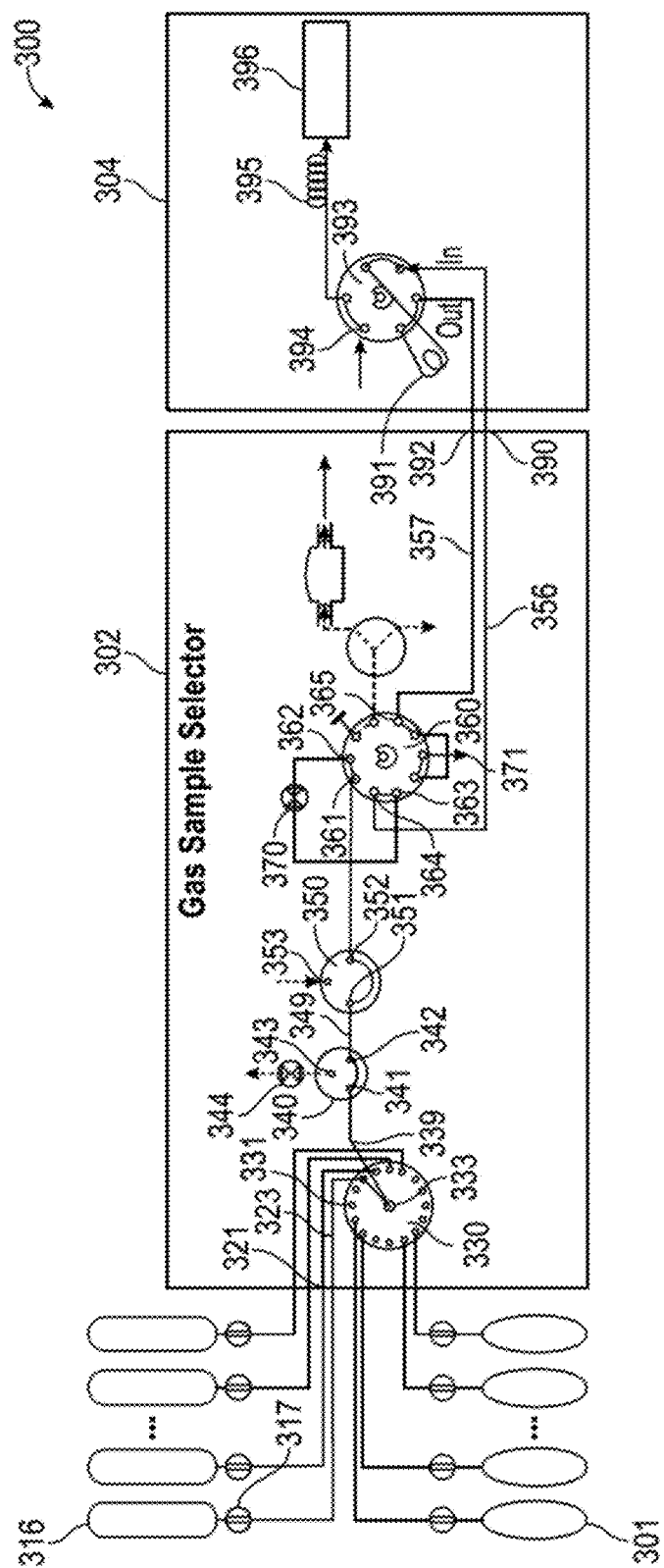
FIGS. 3A and 3B show an embodiment of the present gas sample selector for switching between a plurality of high-pressure gas samples and a plurality of low-pressure gas samples.
Figure 3B:
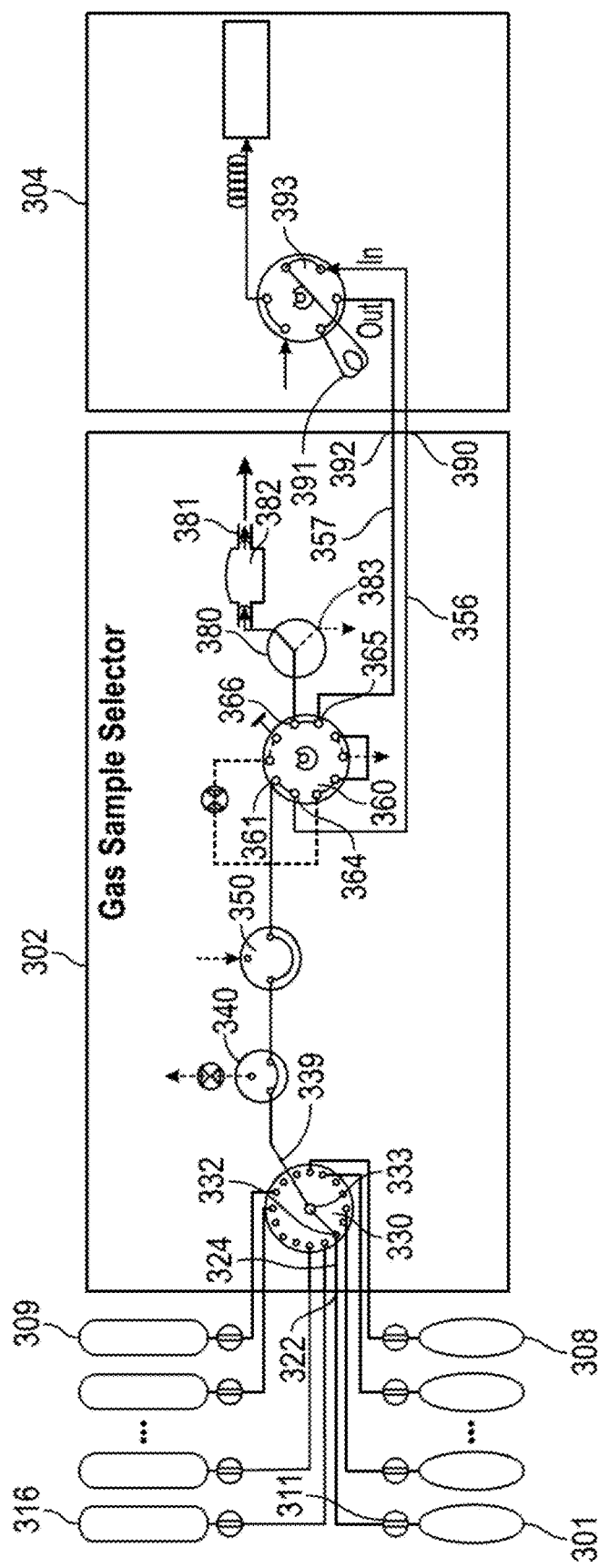

FIGS. 3A and 3B show an embodiment of the present gas sample selector 302 as part of a gas analyzer system 300 that includes a gas chromatograph 304 and sixteen gas sample containers. A gas sample selector 302 is connected to a plurality of gas samples (for example, gas bag 301 and gas cylinder 316). By way of example, the plurality of gas samples comprise eight bags and eight cylinders, though four of each are visible. This is advantageous over many other gas sample selectors because it can accept both low and high pressure samples.

The selector 302 comprises a plurality of selector entrances (for example selector entrance 321) for receiving gas samples from a plurality of sample containers. The selector 302 also comprises a multi-position selector valve 330 comprising a plurality of selector valve inlets (for example, inlet 331) and at least one selector valve outlet 333. The selector valve 330 is in a position where selector valve inlet 331 is fluidically connected to the selector valve outlet 333. In FIGS. 3A and 3B, the multi-position selector valve is depicted with sixteen selector valve inlets, but (as discussed above) the selector valve can have a greater or lesser number of inlets. For example, the multi-position selector valve can have two, three, four, six, eight, 10, 12, 20, 24, 32, 36, 40 or an even greater number of selector valve inlets. The multi-position selector valve is also depicted with one selector valve outlet 333, though it is contemplated that it may have more than one outlet. The selector 302 also optionally comprises a plurality of loading conduits (for example, loading conduits 323), wherein the loading conduits connect the selector entrances to one of the selector valve inlets. The selector entrance to the loading conduit could have a fitting that makes it easy to connect and disconnect sample containers, such as a quick connector, or a hose connector, or it may be comprised of a material such as a soft plastic or rubber tubing.

The selector 302 comprises a flush valve 340 having at least two flush valve positions. In the position shown in FIG. 3A, the flush valve 340 provides a fluid path between the flush valve inlet 341 and the flush valve outlet 342, and, in some embodiments, in another position (not shown), it provides a fluid path between a flush valve vent port 343 and the flush valve outlet 342. In some embodiments, the flush valve can be a 3-way valve. The flush valve vent port 343 can be fluidically connected to a flow restrictor 344. The selector 302 also comprises a selector-flush conduit 339 connecting the selector valve outlet to the flush valve inlet 341.

The selector 302 also comprises a purge valve 350 having at least two purge valve positions. In one of the purge valve positions, the purge valve 350 provides a closed or bidirectional flowpath between a purge valve inlet 351 and a purge valve outlet 352, and in another purge valve position (not shown), it provides a multi-directional flowpath or intersection that includes purge valve port 353, so that purge gas can be provided to the purge valve inlet and the purge valve outlet. Purge valve port 353 is fluidically connected to a source of purge gas. A flush-purge conduit 349 connects the flush valve 340 to the purge valve 350. Suitable materials and operation of the flush valve 340 and the purge valve 250 are described above in connection with FIGS. 1A to 1C. While the flush valve 340 and the purge valve 350 are advantageous, it should be recognized that they are optional in that various embodiments omitting a flush valve and/or a purge valve are also highly advantageous due to their ability to switch between sample containers of different pressures.

In the embodiment shown in FIGS. 3A and 3B, the gas sample selector 302 also comprises a multi-port valve 360 fluidically connected to the purge valve 350 and having a plurality of ports to serve as valve inlets and valve outlets. In embodiments without a purge valve, the multi-port valve 360 can be fluidically connected to the flush valve 340, or to the selector valve 330 if the flush valve 340 is also omitted. In FIGS. 3A and 3B, the multi-port valve is a 10-port, 2-way valve, though other valve types are also contemplated. In these figures, solid lines are used to indicate the gas is flowing through the open flowpath while dotted lines indicate the flowpath is closed, generally due to the positions of the various valves. The multi-port valve 360 is configured to provide a different flowpath for the gas sample, depending on whether the sample source is a high-pressure gas or a low-pressure gas. The multi-port valve 360 directs the sample gas to different components, depending on the pressure of the selected sample container.

In FIG. 3A, the multi-port valve 360 is in a position for receiving a high-pressure gas sample (namely, the sample from gas cylinder 316 when shutoff valve 317 is open). The state of the valves depicted in FIG. 3A allows for loading a high-pressure sample into the GSS and the sample loop of the GC. The gas sample is received at valve port 361, and valve 360 provides a flowpath (such as an internal channel) to valve port 362. The gas sample exits valve 360 and passes through a conduit having a flow restrictor 370. From here, the gas sample flows at a reduced pressure to valve port 363 where it again enters multi-port valve 360, which provides a flowpath to port 364. The gas sample exits valve 360 and passes through valve-exit conduit 356 to selector exit 390. The gas sample flows to the gas chromatograph 304 and into its sample loop 391, via a gas sampling valve 393. In one position of sampling valve 393, sample loop 391 is fluidically connected to selector return port 392, and the gas sample flows through return-valve conduit 357 to port 365 of multi-port valve 360, which provides a flowpath (with one or more conduits) to a vent 371. The flow restrictor 370 fluidically connected to one of the multi-port valve outlets can be a needle valve or other design (such as a fixed restrictor in the form of a tube), so long as it restricts flow of the high-pressure gas sample. In some embodiments, it restricts the sample flow to between 10 mL/min and 300 mL/min, alternatively between 20 mL/min and 200 mL/min. In another position of gas sampling valve 393, the sample gas flows from sample loop 391 to a GC column 395. The gas chromatograph 304 can also include a carrier gas port 394 for receiving a carrier gas to mix with the sample gas and push the sample gas through the GC column 395, and a detector 396 for detecting analytes in the sample gas.

The multi-port valve 360 enables the selector 302 to switch the flowpath of the gas sample between the pump and the flow restrictor, depending upon the pressure of the gas sample. In FIG. 3B, the selector 302 is in a position to receive a low-pressure gas sample from container 301 (e.g., a gas bag). The gas sample enters at selector entrance 322 and flows through loading conduit 324 to the selector valve 330. Loading conduit 324 is fluidically connected to valve inlet 332, and the gas sample valve outlet 333. In some embodiments, the gas sample valve outlet 333 is directly fluidically connected to a multi-port valve 360, provides the advantage of allowing a user to easily switch between high-pressure samples and low-pressure samples. In other embodiments, the gas sample selector 302 also includes a flush valve 340 and/or purge valve 350, in order to provide the further advantage of facilitating the removal of carryover contamination. In the embodiment shown in FIG. 3B, the flush valve 340 and the purge valve 350 can be operated in generally the same manners as described above for flush valves 140, 240 and purge valves 150, 250 for purging sample gas. As noted above, embodiments without a flush valve and/or a purge valve are also advantageous.

In FIG. 3B, the multi-port valve 360 is in a position for receiving a low-pressure gas sample (namely, the sample from gas bag 301). A pump 382 and a pump valve 380 are fluidically connected to one of the multi-port valve outlets 366. The gas sample pump 380 can be a diaphragm pump, which pumps gas out through a vent 381. In FIG. 3B, the multi-port valve 360 is in a position for receiving a low-pressure gas sample (namely, the sample from bag 301) after shutoff valve 311 is opened). The gas sample is received at valve port 361, and valve 360 provides a flowpath (through an internal channel) to valve port 364. The gas sample exits valve 360 and passes through valve-exit conduit 356 to selector exit 390. The gas sample flows to gas chromatograph 304 and into its sample loop 391, which operates as described above. In one position of sampling valve 393, sample loop 391 is fluidically connected to selector return port 392, and the gas sample flows through return-valve conduit 357 to port 365. Multi-port valve 360 provides a flowpath (such as an internal channel) between port 365 and port 366, which is fluidically connected to a pump valve 380, which in one position connects to pump 382 and pump vent 381, and in another position, connects port 366 to vent 383. In this manner, the pump 382 can provide a suction pressure to a flowpath that comprises the valve-exit conduit 356, the selector exit 390, and the sample loop 391 of the gas chromatograph 304, a selector return port 392 and the return-valve conduit 357. The state of the valves depicted in FIG. 3B allows for filling of the sample loop 391 in GC 304 with sample gas from gas bag 301.

The gas sample selector 302 can be operated to reduce carryover, using steps as discussed in connection with FIGS. 1A, 1B and 1C. Gas sample selector 302 comprises a purge valve 350 fluidically connected to a purge gas source, and the purge valve is selectably controlled to purge the gas sample selector. The purge gas source can be the carrier gas source which provides a carrier gas to the gas analyzer or another gas, such as nitrogen or air. During purging, the multi-port valve 360 may be in the same position as it was for the previous gas sample, so that any residual previous gas sample will be removed in an effort to reduce carryover.

In the apparatus shown in FIGS. 3A and 3B, low-pressure gas sample containers 301 to 308 (e.g., gas bags) are attached to selector entrances and high-pressure gas sample containers 309 to 316 (e.g., gas cylinders) are attached to selector entrances. In some embodiments, the gas sample selector 302 determines the sample container type according to the detected sample position. In some embodiments, the selector entrances are configured so that they only connect to a particular type of container. Alternatively, the selector entrances, can be configured to connect to any type of container. The GSS may be configured to detect the type of container, such as by having pressure sensors at the selector entrance or by providing a user interface that allows a user to identify the type of container. The GSS then decides the appropriate actions for cylinder or bag accordingly, such as switching the position of multi-port valve 360 to flow a high-pressure sample gas through the flow restrictor 370 or to flow a low-pressure sample gas through pump 382. More particularly, when the gas sample selector 302 receives a signal to switch from one gas sample requiring flow-limiting restrictor 370 (such as gas cylinder 316) to another pressure gas sample requiring the assistance of pump 382 (such as gas bag 301), multi-position selector valve 330 is switched to a different position, and flush valve 340 is opened so the previous sample inside the dead volume between the port of multi-position selector valve 330 and the flush valve 340 is vented and then flushed by a new sample. After a short time, flush valve 340 is closed again. This procedure minimizes carryover contamination caused by switching from a high-pressure gas sample to a low-pressure gas sample, or from a low-pressure gas sample to a high-pressure gas sample.

The present apparatus (as illustrated by the embodiments described herein) can also comprise a controller, either as a part of the gas sample selector, or as an external device in communication with it. The controller typically comprises a processor and memory. The controller is in electrical communication with, receives data from, and/or sends commands to the selector valve, the flush valve, the purge valve, the multi-port valve, the pump and/or the pump valve.

Figure 4:
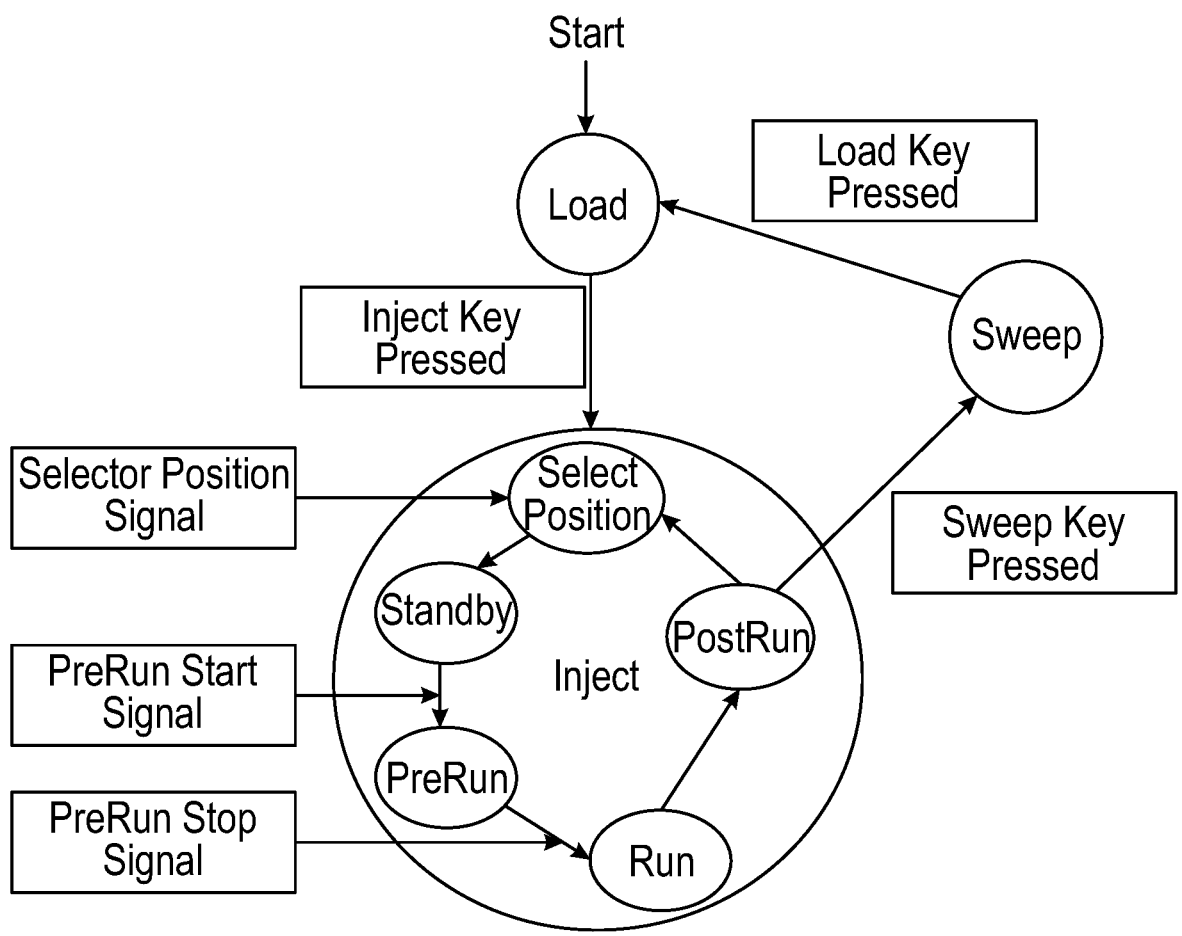
FIG. 4 provides an illustration of an exemplary workflow for reducing carryover in a gas sample selector.

FIG. 4 provides an illustration of an exemplary workflow for reducing carryover in a gas sample selector. As an initial step, gas sample containers are attached to a gas sample selector, and a "Load" mode is commenced. If the gas sample containers have a shutoff valve attached to their outlet, this shutoff valve is opened. In the Load mode, the multi-position selector valve is positioned such that a valve inlet port for a position where a sample container is connected is fluidically connected to the valve outlet. The flush valve is positioned such that the flush valve inlet connects to the flush valve outlet so that previous gas sample, purging gas, or possibly air that got in when removing and reattaching samples sealed inside the volume between the selector entrance and the selector exit is vented out of the gas sample selector through the selector exit or a vent, and then filled by a new gas sample. Additionally, in those embodiments that include a multi-port valve (such as the multi-port valve 360 shown in FIG. 3A), the multi-port valve is switched to a position that provides a flowpath desired based on the pressure of the gas sample (e.g., a flowpath comprising a flow restrictor or a pump). After a pre-set time, the flush valve is switched to a position which fluidically connects the flush valve vent and the flush valve outlet and/or which prevents a fluidic connection between the flush valve inlet and the flush valve outlet. In some embodiments, the flush valve is switched between valve positions automatically. This procedure minimizes carryover contamination caused by sample loading. The purge gas source is then fluidically connected to the purge valve inlet and purge valve outlet, and purge gas flushes the system from the purge valve to the flush valve vent and to the selector exit. If the selector exit is fluidically connected to a GC and sample loop, the sample loop is also flushed. The selector valve can be switched to another position while flush valve inlet is closed (that is, not fluidically connected to flush valve outlet), and the foregoing actions can be repeated until all of the gas samples are loaded onto the loading conduits and selector valve inlets of the gas sample selector. In some embodiments, several or all of the gas sample in the sample containers are loaded into their respective loading conduits before continuing the workflow. In some embodiments, one of the gas samples is loaded in the loading conduit and the workflow for that gas sample continues (as described below) before loading another of the gas samples into its respective loading conduit.

Next in the workflow for a gas sample, a signal is provided (such as from a controller or by a user pressing an "Inject" key) and a gas sample can be introduced into the gas analyzer in an "Inject" mode (optionally after performing the "Load" mode steps for the gas sample to be injected). The initial state is the "Standby" state, in which the flush valve is in a position to fluidically connect the flush valve vent and flush valve outlet. When the GSS receives a signal to enter a "PreRun" state (such as a PreRun Start signal from an external device or from a key pressed by a user), it enters the PreRun state, in which the flush valve is switched to a position to connect the flush valve inlet to the flush valve outlet to provide a flowpath for the gas sample through the GSS and to the gas analyzer (for example to a sample loop). In some embodiments of the present methods, where the gas sample selector has the capacity for switching between high-pressure and low-pressure gas samples, a signal is also provided to switch a flowpath within the GSS, such as by switching a multi-port valve to switch from a flowpath that includes a restrictor to a flowpath that includes a pump, or vice versa. The signal can be provided automatically or manually, and it is generally based on the pressure of the particular gas sample being provided from the gas sample container. The PreRun state is maintained until the GSS receives a "PreRun Stop" signal. The PreRun state or flushing time can be selected by the user, and typically ranges from 0.4 min to 4 min, alternatively from 0.9 to 1.9 min. Then the system enters "Run" state, where the flush valve is moved to a position where the flush valve vent is fluidically connected to the flush valve outlet (or a position that prevents a fluidic connection between the valve inlet and valve outlet), and the gas analyzer is given several seconds to allow the sample pressure in the sample loop to reach equilibrium with the surrounding area (which is typically at atmospheric pressure) before injection. It has been found that this operation provides good repeatability. During injection, the sample loop is placed in-line with the GC column flowpath and the sample is injected onto the column for analysis. After a pre-set time (or in response to a signal), the gas sample selector enters "PostRun" state, in which the gas sampling valve switches to place the sample loop in the gas chromatograph in fluidic connection with the outlet of the gas sample selector, the flush valve is placed in a position to connect the flush valve vent and the flush valve outlet (or to close the fluidic connection between the flush valve inlet and flush valve outlet), the purge valve is switched to a position that flows purge gas into the gas sample selector between the flush valve and the selector exit or the exit of the sample loop in the GC or pump outlet in the GSS, and the sample flowpath downstream of the flush valve is cleaned for the next sample injection, which helps reduce the time required for the next sample to flush out the previous sample from the flowpath. If there are more samples to be analyzed, the multi-position selector valve can be switched to the next sample position, and the process from Standby state to PostRun state can be repeated for the remaining samples.

After all samples are analyzed, the sample flowpath can also be cleaned to thoroughly remove sample residue. The sample containers can be physically disconnected from the gas sample selector by a user, and the selector entrance can be opened to atmosphere either by merely disconnecting a sample container or, if required based on the type of connector used for the selector entrance, by connecting a fitting to open up the selector entrance to atmosphere. The gas sample selector is placed in "Sweep" mode, where the flush valve is moved to a position to connect the flush valve inlet to the flush valve outlet, the purge valve is switched to a position that allows for the flow of purge gas into the gas sample selector flowpath between the purge valve and the selector entrance and between the purge valve and the selector exit or the exit of the sample loop in the GC or the exit of the pump in the gas sample selector, and the multi-position selector valve switches among various positions automatically so that residual gas is removed from the loading conduits. The entire sample flowpath of GSS is cleaned thoroughly and will be ready for attaching a new set of sample containers. By using this workflow with the present gas sample selector, sources of contamination that contribute to carryover are addressed, and carryover is minimized.

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

The term "valve" generally encompasses any structure that can be adjusted (such as by switching or turning on or off) to change a flowpath into, out of, and/or through the structure. Generally, a valve is substantially fluid-tight so as to prevent loss of fluid from the flowpath. An example of a suitable valve (e.g., the selector valve, the flush valve, and/or the multi-port valve) is a rotary valve, such as a rotary valve comprising a stator and a rotor. A rotary valve comprises a stator and a rotor, wherein one or both of the stator and the rotor are rotable to different rotary valve positions. The stator and the rotor have surfaces adjacent to each other, and one or both is configured to rotate with respect to the other. The valve inlets and outlet(s) in this embodiment are passages or through-holes in the stator. The rotor comprises a switchable fluid path, which may be a groove in the rotor surface. By rotating the stator and/or the rotor, the fluid path connects a different valve inlet with the valve outlet. Other examples of suitable valves are diaphragm valves, etc. Examples of valves suitable as the purge valve in the present apparatus include flow switching valves, 3-way solenoid valves, 2-position 3/4/6/8 or 10 ports rotary/diaphragm valves, etc. Typical valve materials include metal materials which may or may not be inert. The valve desirably has low dead-volume so as to leave a low flush time and not trap sample. In some embodiments, the flush valve is a 2-way valve with on/off positions.

The term "conduit" generally encompasses any structure configured to define a flowpath for fluid to travel from one point (e.g., an inlet of the conduit) to another point (e.g., an outlet of the conduit), though a conduit can deliver fluid to intermediate points as well. A conduit can be flexible, rigid, or both in some measure or portions. A conduit can be relatively long or short, and/or linear or nonlinear, so long as it provides a flowpath from one component (such as a gas source) to another component (such as a vent). For example, a conduit can be a long tube, a short fitting, or a manifold with multiple entrances and/or exits. A conduit typically has an entrance and an exit, though in some embodiments, a conduit can have multiple entrances and/or exits, such as where a conduit with two or more entrances converges or joins to one exit, or where a conduit with one entrance diverges or splits to two or more exits. A conduit is often described by its length and inner diameter (i.d.) which can be used to calculate a volume of a conduit. For instance, an exemplary conduit has a length between 10 cm and 50 cm and an inner diameter of 0.02 inch; such a conduit would have a volume of 0.02 to 0.10 mL. Of course conduits of other lengths, inner diameters, and volumes are also contemplated. The geometry of a conduit may vary widely and includes circular, rectangular, square, D-shaped, trapezoidal or other polygonal cross-sections. A conduit may comprise varying geometries (e.g., rectangular cross-section at one section and trapezoidal cross-section at another section). For conduits in the sample flowpath, stainless steel or other metal tubing is often preferred to avoid contamination, but other materials may be used, such as plastics, fused silica, and other metals. The conduits and valves may optionally be coated with a material to improve inertness, such as a deactivation coating.

The term "connected" means that two components are fluidically connected, or physically connected, or both. The term "fluidically connected" means that two components are in fluid communication and includes direct connections between the two components as well as indirect connections where one or more other components are in the flowpath between the two components. For example, a first component and a second component are fluidically connected if an outlet from the first component is physically connected to an inlet of the second component, or if a conduit connects the first and second components, or if one or more intervening components, such as a valve, a pump, or other structure, is between the two components as fluid flows from the first component to the second component, or vice versa. Components can be physically connected in any suitable way, such as by using ferrules, brazing, and other approaches. In general, physical connections that are fluid-tight and/or that minimize dead-volume are desired for the present apparatus.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that both the exact value is disclosed as well as approximate values. It should also be understood that any lower and higher values can be combined to form a range.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described. All patents and publications referred to herein are expressly incorporated by reference.

As used in the specification and appended claims, the terms "a," "an," and "the" include both singular and plural referents, unless the context clearly dictates otherwise. Thus, for example, "a conduit" includes one conduit and plural conduits. Unless otherwise indicated, the terms "first", "second", "third", and other ordinal numbers are used herein to distinguish different elements of the present devices and methods, and are not intended to supply a numerical limit. Reference to first and second valve positions should not be interpreted to mean that the device only has two valve positions. An apparatus having first and second element can also include a third, a fourth, a fifth, and so on, unless otherwise indicated.

Exemplary Embodiments

Exemplary embodiments provided in accordance with the presently disclosed subject matter include, but are not limited to, the following:

1. A gas sample selector for selecting from multiple gas samples, the gas sample selector comprising:
   a plurality of selector entrances for receiving gas samples;
   a multi-position selector valve comprising a plurality of selector valve inlets and at least one selector valve outlet, and in different valve positions, a different selector valve inlet is fluidically connected to the at least one selector valve outlet;
   a flush valve having at least two flush valve positions, and in one flush valve position, the flush valve provides a flowpath between a flush valve inlet and a flush valve outlet, and in another flush valve position, it provides a flowpath between a flush valve vent port and the flush valve inlet and/or the flush valve outlet;

wherein the selector valve outlet is fluidically connected to the flush valve inlet;

a purge valve having at least two purge valve positions, and in one purge valve position, the purge valve allows flow of purge gas to the purge valve inlet and the purge valve outlet, and in another purge valve position, it prevents a flow of purge gas to the purge valve inlet or the purge valve outlet;

wherein the flush valve outlet is fluidically connected to the purge valve inlet; and a selector exit for providing a gas sample to an analyzer; wherein the selector exit is fluidically connected to the purge valve outlet.

2. The gas sample selector of embodiment 1, wherein the flush valve vent port is fluidically connected to a surrounding area.

3. The gas sample selector of embodiment 1 or embodiment 2, further comprising a pump, wherein the pump is fluidically connected to the purge valve outlet; or a flow restrictor fluidically connected to the purge valve outlet, or both the pump and the flow restrictor.

4. A gas sample selector for selecting from multiple gas samples, the gas sample selector comprising:

a plurality of selector entrances for receiving gas samples;

a multi-position selector valve comprising a plurality of selector valve inlets and at least one selector valve outlet, where in different valve positions, a different selector valve inlet is fluidically connected to the at least one selector valve outlet;

a multi-port valve comprising a plurality of valve ports, wherein at least one of the valve ports is fluidically connected to the at least one selector valve outlet;

a pump fluidically connected to one of the valve ports; and a flow restrictor fluidically connected to one or more of the valve ports;

wherein the multi-port valve has at least two valve positions, and in one valve position, the multi-port valve creates a fluidic connection between the multi-position selector valve and the pump and in another valve position, the multi-port valve creates a fluidic connection between the multi-position selector valve and the flow restrictor.

5. The gas sample selector of embodiment 4, further comprising:

a flush valve having at least two flush valve positions, and in one flush valve position, the flush valve provides a flowpath between a flush valve inlet and a flush valve outlet, and in another flush valve position, the flush valve provides a flowpath between a flush valve vent port and the flush valve inlet and/or the flush valve outlet; and a selector-flush conduit fluidically connecting the at least one selector valve outlet to the flush valve inlet.

6. The gas sample selector of embodiment 4, further comprising:

a flush valve having two flush valve positions, and in one of the valve positions, the flush valve inlet and the flush valve outlet are fluidically connected, and in another of the valve positions, the flush valve inlet and the flush valve outlet are not fluidically connected; and a selector-flush conduit fluidically connecting the at least one selector valve outlet to the flush valve inlet.

7. The gas sample selector of embodiment 5 or embodiment 6, further comprising:

a purge valve having at least two purge valve positions, and in one purge valve position, the purge valve allows flow of purge gas to the purge valve inlet and the purge valve outlet, and in another purge valve position, it prevents a flow of purge gas to the purge valve inlet or the purge valve outlet; and a purge-valve conduit fluidically connecting the purge valve to the flush valve outlet.

8. The gas sample selector of embodiment 4, wherein the flow restrictor is a needle valve.

9. The gas sample selector of embodiment 4, wherein the multi-port valve is a rotary valve comprising six, eight, ten or more ports.

10. The gas sample selector of embodiment 1 or embodiment 4, wherein the purge valve is fluidically connected to a purge gas source, such as air, helium, hydrogen, nitrogen, or a mixture of argon and methane.

11. The gas sample selector of embodiment 1 or embodiment 4, further comprising a controller in signal communication with one or more of the multi-position selector valve, the flush valve, and/or the purge valve.

12. A gas analyzer system comprising a gas chromatograph comprising a chromatograph entrance; and the gas sample selector of embodiment 1, wherein the selector exit is fluidically connected to the chromatograph entrance.

13. A gas analyzer system comprising a gas chromatograph comprising a chromatograph entrance; and the gas sample selector of embodiment 5, wherein the selector exit is fluidically connected to the chromatograph entrance.

14. The gas analyzer system of embodiment 12 or embodiment 13, further comprising a plurality of gas sample containers fluidically connected to selector entrances of the gas sample selector, and one or more of the gas sample containers is a high-pressure gas sample container, and one or more of the gas sample containers is a low-pressure gas sample container.

15. The gas analyzer of embodiment 12 or embodiment 13, wherein the gas chromatograph comprises a sample loop in fluidic communication with the selector exit.

16. The gas analyzer system of embodiment 12 or embodiment 13, wherein the gas sample selector further comprises a selector return port, and the gas chromatograph comprises a chromatograph exit, and the selector return port is fluidically connected to the chromatograph exit.

17. The gas analyzer system of embodiment 12 or embodiment 13, where in the gas chromatograph contains a sample loop and the sample loop is fluidically connected to the selector exit.

18. A method of operating the gas sample selector of embodiment 1, the method comprising:

flowing a sample gas from a selector entrance to a selector exit with the flush valve in a position to connect the flush valve inlet to the flush valve outlet and the purge valve in a position to prevent the flow of purge gas to the purge valve inlet and purge valve outlet; In this manner, the sample gas can be loaded into the sample loop, and from there, the sample gas is provided to the column. After the column has been loaded, it is desirable to remove the sample gas remaining in the gas sample selector, so the following steps can be performed:

switching the flush valve to connect the flush valve vent and flush valve outlet and disconnect the flush valve inlet from the flush valve outlet thereby preventing sample gas flow downstream of the flush valve; and flowing purge gas through the purge valve port such that purge gas flows to the selector exit and to the flush valve vent to remove sample gas from the flowpath between the flush valve and the selector exit.

19. The method of embodiment 18, wherein one of the selector entrances is attached directly or indirectly to a sample container, and the method further comprises:
   disconnecting the sample container from the selector entrance;
   switching the flush valve such that the flush valve inlet and flush valve outlet are fluidically connected; and
   flowing purge gas from the purge valve through the selector entrance and/or through the multi-position selector valve.

20. The method of embodiment 18, wherein the method further comprises:
   stopping flow of the purge gas, and disconnecting the sample container from the selector entrance;
   connecting a new sample container to the entrance of the selector; and
   flowing the new sample from the entrance of the selector, through the multi-position selector valve, and out the selector exit while the flush valve inlet is fluidically connected to the flush valve outlet.

21. The method of embodiment 20, wherein the connecting step comprises connecting two or more new gas samples to the selector entrances of the gas sample selector, and the method further comprises:
   loading a first gas sample to the gas sample selector by switching the multi-position selector valve to a position where the first gas sample is selected, positioning the flush valve such that the flush valve inlet and the flush valve outlet are fluidically connected, positioning the purge valve to prevent flow of purge gas, and flowing the first gas sample from a selector entrance to a selector exit of the gas sample selector;
   after the loading of the first gas sample, purging residual first gas sample by switching the flush valve to disconnect the flush valve inlet from the flush valve outlet, and optionally to connect the flush valve vent and the flush valve outlet and switching the purge valve to connect the purge valve port to the purge valve outlet, and optionally to the purge valve inlet, and flowing purge gas from the purge valve to the selector exit and optionally to the flush valve vent, to remove the residual first gas sample; and
   loading a second gas sample to the gas sample selector by switching the multi-position selector valve to a position where the second gas sample is selected, positioning the flush valve such that the flush valve inlet and the flush valve outlet are fluidically connected, positioning the purge valve to prevent flow of purge gas, and flowing the second gas sample from a selector entrance to a selector exit of the gas sample selector.

22. The method of embodiment 18, wherein a multi-port valve having more than one position is located between the purge valve outlet and the selector exit; and before the step of flowing the sample gas from the selector entrance to the selector exit, deciding whether the gas sample in the connected sample container should flow through a pump or a fluid restrictor, and switching the multi-port valve is switched to a valve position based on the decision,
   wherein the multi-port valve has at least two valve positions, and in one of the valve positions, the multi-port valve creates a fluidic connection between the multi-position selector valve and a pump and in another of the valve positions, the multi-port valve creates a fluidic connection between the multi-position selector valve and a flow restrictor.

23. The method of embodiment 18, wherein the gas sample selector is fluidically connected to a gas analyzer system containing a gas chromatograph with a sample loop, and the exit of the gas sample selector is fluidically connected to the entrance of the gas chromatograph, and the method comprises flowing the sample gas and/or the purge gas out of the exit of the gas sample selector and into the gas chromatograph and through the sample loop.

24 The method of embodiment 23, wherein after the flowing of the sample gas from a selector entrance to a selector exit, the sample loop is fluidically connected to a gas chromatography column and then switched back to a fluidic connection with the gas sample selector.

25. The method of embodiment 23, wherein after the sample gas fills the sample loop, the flush valve is switched to connect the flush valve outlet with the flush valve vent, thereby allowing the pressure in the sample loop to equilibrate with the surrounding area.

26. A gas sample selector for selecting from multiple gas samples, the selector comprising:
   a plurality of selector entrances for receiving gas samples;
   a multi-position selector valve comprising a plurality of selector valve inlets and at least one selector valve outlet, and in different valve positions, a different selector valve inlet is fluidically connected to the at least one selector valve outlet;
   a flush valve having two flush valve positions, and in one of the valve positions, the flush valve inlet and the flush valve outlet are fluidically connected, and in another of the valve positions, the flush valve inlet and the flush valve outlet are not fluidically connected;
   wherein the selector valve outlet is fluidically connected to the flush valve inlet;
   a purge valve having at least two purge valve positions, and in one purge valve position, the purge valve allows flow of purge gas to the purge valve inlet and/or the purge valve outlet, and in another purge valve position, it prevents a flow of purge gas to the purge valve inlet or the purge valve outlet;
   wherein the flush valve outlet is fluidically connected to the purge valve inlet; and
   a selector exit for providing a gas sample to an analyzer; wherein the selector exit is fluidically connected to the purge valve outlet.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A gas sample selector configured for selecting from multiple gas samples, the gas sample selector comprising:
   a plurality of selector entrances configured for receiving gas samples;
   a multi-position selector valve comprising a plurality of selector valve inlets and at least one selector valve outlet, and in different valve positions, a different selector valve inlet is fluidically connected to the at least one selector valve outlet;
   a flush valve having at least two flush valve positions, and in one flush valve position, the flush valve provides a flowpath between a flush valve inlet and a flush valve outlet, and in another flush valve position, the flush valve provides a flowpath between a flush valve vent port and the flush valve inlet and/or the flush valve outlet;

wherein at least one selector valve outlet is fluidically connected to the flush valve inlet;

a purge valve having at least two purge valve positions, and in one purge valve position, the purge valve allows flow of purge gas to a purge valve inlet and a purge valve outlet, and in another purge valve position, the purge valve prevents a flow of purge gas to the purge valve inlet or the purge valve outlet;

wherein the flush valve outlet is fluidically connected to the purge valve inlet; and a selector exit configured for providing a gas sample to an analyzer;

wherein the selector exit is fluidically connected to the purge valve outlet.

2. The gas sample selector of claim 1, wherein the flush valve vent port is fluidically connected to a surrounding area.

3. The gas sample selector of claim 1, further comprising:
a pump, wherein the pump is fluidically connected to the purge valve outlet; or
a flow restrictor fluidically connected to the purge valve outlet, or
both the pump and the flow restrictor are fluidically connected to the purge valve outlet.

4. The gas sample selector of claim 1, wherein the purge valve is fluidically connected to a purge gas source.

5. The gas sample selector of claim 1, further comprising a controller in signal communication with one or more of the multi-position selector valve, the flush valve, and/or the purge valve.

6. A gas analyzer system comprising:
a gas chromatograph comprising a chromatograph entrance;
the gas sample selector of claim 1, wherein the selector exit is fluidically connected to the chromatograph entrance.

7. The gas analyzer system of claim 6, further comprising a plurality of gas sample containers fluidically connected to selector entrances of the gas sample selector, and one or more of the gas sample containers is a high-pressure gas sample container, and one or more of the gas sample containers is a low-pressure gas sample container.

8. The gas analyzer of claim 6, wherein the gas chromatograph comprises a sample loop in fluidic communication with the selector exit.

9. The gas analyzer system of claim 6, wherein the gas sample selector further comprises a selector return port, and the gas chromatograph comprises a chromatograph exit, and the selector return port is fluidically connected to the chromatograph exit.

10. The gas analyzer system of claim 6, where in the gas chromatograph contains a sample loop and the sample loop is fluidically connected to the selector exit.

11. A method of operating the gas sample selector of claim 1, the method comprising:
flowing a sample gas from a selector entrance to a selector exit with the flush valve in a position to connect the flush valve inlet to the flush valve outlet and the purge valve in a position to prevent the flow of purge gas to the purge valve inlet and purge valve outlet;
switching the flush valve to connect the flush valve vent and flush valve outlet and disconnect the flush valve inlet from the flush valve outlet thereby preventing sample gas flow downstream of the flush valve; and
flowing purge gas through the purge valve port such that purge gas flows to the selector exit and to the flush valve vent to remove sample gas from the flowpath between the flush valve and the selector exit.

12. The method of claim 11, wherein one of the selector entrances is attached directly or indirectly to a sample container, and the method further comprises:
disconnecting the sample container from the selector entrance;
switching the flush valve such that the flush valve inlet and flush valve outlet are fluidically connected; and
flowing purge gas from the purge valve through the selector entrance and/or through the multi-position selector valve.

13. The method of claim 11, wherein the method further comprises:
stopping flow of the purge gas, and disconnecting the sample container from the selector entrance;
connecting a new sample container to the entrance of the selector; and
flowing the new sample from the entrance of the selector, through the multi-position selector valve, and out the selector exit while the flush valve inlet is fluidically connected to the flush valve outlet.

14. A gas sample selector configured for selecting from multiple gas samples, the gas sample selector comprising:
a plurality of selector entrances configured for receiving gas samples;
a multi-position selector valve comprising a plurality of selector valve inlets and at least one selector valve outlet, where in different valve positions, a different selector valve inlet is fluidically connected to the at least one selector valve outlet;
a multi-port valve comprising a plurality of valve ports, wherein at least one of the valve ports is fluidically connected to the at least one selector valve outlet;
a pump fluidically connected to one of the valve ports;
a flow restrictor fluidically connected to one or more of the valve ports; and
wherein the multi-port valve has at least two valve positions, and in one valve position, the multi-port valve creates a fluidic connection between the multi-position selector valve and the pump and in another valve position, the multi-port valve creates a fluidic connection between the multi-position selector valve and the flow restrictor.

15. The gas sample selector of claim 14, further comprising:
a flush valve having at least two flush valve positions, and in one flush valve position, the flush valve provides a flowpath between a flush valve inlet and a flush valve outlet, and in another flush valve position, the flush valve provides a flowpath between a flush valve vent port and the flush valve inlet and/or the flush valve outlet; and
a selector-flush conduit fluidically connecting the at least one selector valve outlet to the flush valve inlet.

16. The gas sample selector of claim 15, further comprising:
a purge valve having at least two purge valve positions, and in one purge valve position, the purge valve allows flow of purge gas to the purge valve inlet and the purge valve outlet, and in another purge valve position, the purge valve prevents a flow of purge gas to the purge valve inlet or the purge valve outlet; and
a purge-valve conduit fluidically connecting the purge valve to the flush valve outlet.

17. A gas analyzer system comprising:
- a gas chromatograph comprising a chromatograph entrance;
- the gas sample selector of claim 15, wherein the selector exit is fluidically connected to the chromatograph entrance.

18. The gas sample selector of claim 14, further comprising:
- a flush valve having two flush valve positions, and in one of the valve positions, the flush valve inlet and the flush valve outlet are fluidically connected, and in another of the valve positions, the flush valve inlet and the flush valve outlet are not fluidically connected; and
- a selector-flush conduit fluidically connecting the at least one selector valve outlet to the flush valve inlet.

19. The gas sample selector of claim 14, wherein the flow restrictor is a needle valve.

20. The gas sample selector of claim 14, wherein the multi-port valve is a rotary valve comprising six, eight, ten or more ports.

\* \* \* \* \*